United States Patent
Stuut

(10) Patent No.: US 11,578,746 B2
(45) Date of Patent: *Feb. 14, 2023

(54) COUPLING FOR CONNECTING CONSTRUCTION PARTS, A TRUSS PROVIDED THEREWITH AND ASSOCIATED METHOD AND USE

(71) Applicant: PROLYTE B.V., 'S-Gravenhage (NL)

(72) Inventor: Johann Stuut, Leek (NL)

(73) Assignee: AREA FOUR INDUSTRIES CESKO S.R.O., Roundnice Nad Labem (CZ)

(*) Notice: Subject to any disclaimer, the term of this patent is extended or adjusted under 35 U.S.C. 154(b) by 1191 days.

This patent is subject to a terminal disclaimer.

(21) Appl. No.: 16/074,375

(22) PCT Filed: Feb. 5, 2016

(86) PCT No.: PCT/NL2016/050085
§ 371 (c)(1),
(2) Date: Jul. 31, 2018

(87) PCT Pub. No.: WO2017/135807
PCT Pub. Date: Aug. 10, 2017

(65) Prior Publication Data
US 2021/0190118 A1    Jun. 24, 2021

(51) Int. Cl.
*E04G 7/20* (2006.01)
*F16B 21/16* (2006.01)
(Continued)

(52) U.S. Cl.
CPC ............ *F16B 21/165* (2013.01); *E04B 1/585* (2013.01); *E04G 7/20* (2013.01); *E04G 11/50* (2013.01);
(Continued)

(58) Field of Classification Search
CPC .. F16B 7/042; F16B 2012/403; F16B 21/165; E04G 7/20; E04H 12/10; Y10T 403/55; Y10T 403/592; E04B 1/1903
See application file for complete search history.

(56) References Cited

U.S. PATENT DOCUMENTS 1,879,364 A * 9/1932 Lomar ................... F16L 37/23
                                                            285/349
2,394,236 A * 2/1946 Eastman ................ F16L 37/40
                                                            251/149.6
(Continued)

FOREIGN PATENT DOCUMENTS

CN     102829037 A    12/2012
DE     10114059       6/2002
(Continued)

OTHER PUBLICATIONS

Chinese Office Action issued in corresponding Chinese Patent Application No. 201580085068.7 dated May 29, 2020.

*Primary Examiner* — Michael P Ferguson
(74) *Attorney, Agent, or Firm* — Squire Patton Boggs (US) LLP

(57) ABSTRACT

The invention relates to a coupling for connecting construction parts, a truss provided therewith and associated method and use. The coupling comprises a female and a male coupling part. The female coupling part comprises: a tubular receiving part, the wall of which an opening is provided; a ball which is placed in the opening and which is movable in radial direction of the receiving part; and a locking sleeve which is screwed onto and encloses the receiving part and which by being screwed is movable in the longitudinal direction of the receiving part between an opened position, in which the locking sleeve allows movement of the ball in the opening for the purpose of placing/removing the male coupling part into/from the receiving part, and a closed (Continued)

position in which the locking sleeve locks the male coupling part in the female coupling part with the ball, wherein the male coupling part is an elongate pin which comprises in its outer wall a groove for the ball.

17 Claims, 6 Drawing Sheets

(51) Int. Cl.
*E04B 1/58* (2006.01)
*E04G 11/50* (2006.01)
*F16B 7/04* (2006.01)

(52) U.S. Cl.
CPC ............. *F16B 7/042* (2013.01); *Y10T 403/55* (2015.01); *Y10T 403/592* (2015.01)

(56) References Cited

U.S. PATENT DOCUMENTS

| | | | | |
|---|---|---|---|---|
| 3,964,771 A | * | 6/1976 | Baudouin | F16B 21/165 439/348 |
| 4,900,182 A | * | 2/1990 | Stillwagon | F16B 7/1409 403/322.2 |
| 5,522,669 A | * | 6/1996 | Recker | F16B 21/165 403/328 |
| 5,577,859 A | * | 11/1996 | Nau | F16D 1/116 403/325 |
| 5,820,291 A | * | 10/1998 | Lutz | F16D 1/116 29/523 |
| 6,390,747 B1 | * | 5/2002 | Commins | F16B 43/009 411/536 |
| 8,371,768 B1 | * | 2/2013 | Wu | F16B 7/042 403/294 |
| 9,926,960 B2 | * | 3/2018 | Stuut | F16M 11/24 |

FOREIGN PATENT DOCUMENTS

| | | |
|---|---|---|
| EP | 2982808 | 2/2016 |
| FR | 2462797 A1 | 2/1981 |
| GB | 666415 | 2/1952 |
| NL | 1031445 C2 | 9/2007 |

* cited by examiner

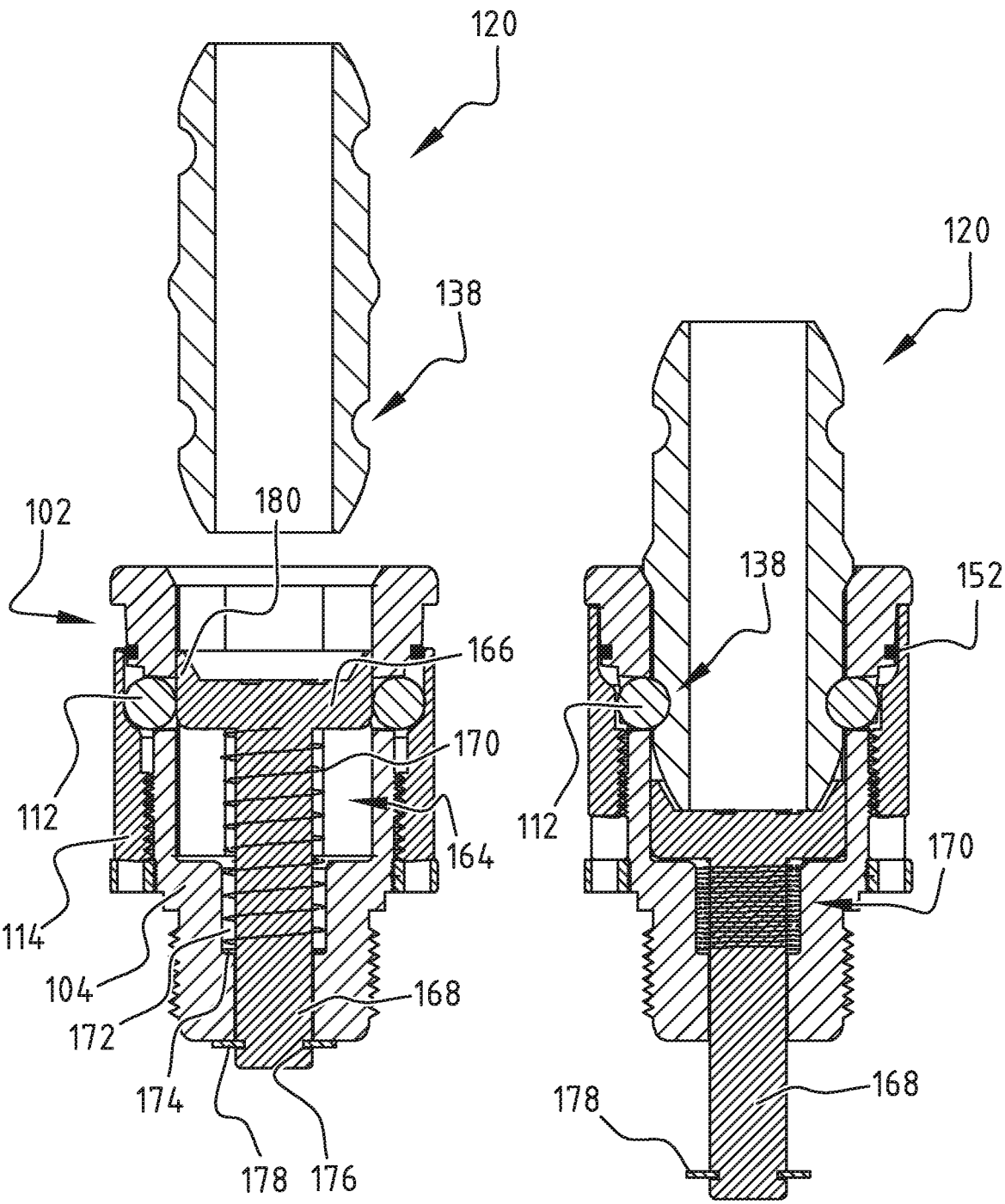

COUPLING FOR CONNECTING CONSTRUCTION PARTS, A TRUSS PROVIDED THEREWITH AND ASSOCIATED METHOD AND USE

FIELD

The invention relates to a coupling for connecting construction parts, comprising a female coupling part and a male coupling part. The invention relates particularly to a coupling for connecting stiff construction parts, more particularly trusses, also referred to as lattice girders or simply girders. Trusses comprise a number of parallel girders which are mutually connected by means of cross braces and/or diagonals, for instance in the form of bars. By connecting such trusses to each other truss constructions are formed which are applied for instance as support frame, roof construction or staging. Truss constructions are for instance applied for the construction of stages and stands. Trusses are generally manufactured from a metal or a metal alloy, in particular aluminium or an aluminium alloy.

BACKGROUND

Couplings for trusses are known from NL 1018901 and NL 1027917. The known couplings comprise a tubular female coupling part in which a male coupling part can be received. A hole is arranged in transverse direction through both the female coupling part and the male coupling part so that the coupling parts can be fixed by placing of a locking pin. The locking pin is in turn secured by a cotter pin or nut.

A drawback of the known couplings is that it is necessary to work with a relatively large number of components during the assembly of a truss construction. The locking pin and the cotter pin are moreover relatively small components which can therefore be easily lost. A further drawback is that during the assembly of constructions the locking pin has to be hammered into the hole of the coupling parts for the purpose of fixation, and this can cause noise nuisance in some situations.

SUMMARY

An object of the invention is to obviate or in any case reduce the above problems and to provide a coupling with which it is possible to work with fewer components and fewer tools during assembly of a construction, whereby a rapid assembly is possible and whereby quieter assembly moreover becomes possible.

This object is achieved with the coupling for connecting construction parts according to the invention comprising a female coupling part and a male coupling part for placing in the female coupling part, the female coupling part comprising:

- a receiving part which is at least partially tubular and comprises at its outer end an insertion opening for receiving a male coupling part in the tubular portion, wherein at least one through-opening is provided in the wall of the tubular portion of the receiving part;
- a ball which is placed in the at least one through-opening and which is movable in radial direction of the receiving part; and
- a locking sleeve which is screwed onto the receiving part and encloses the receiving part, wherein by being screwed the locking sleeve is movable relative to the receiving part in the longitudinal direction of the receiving part between an opened position, in which the locking sleeve allows a movement of the ball in the at least one through-opening in a direction away from the longitudinal axis of the receiving part for the purpose of placing a male coupling part into the receiving part or removing it from the receiving part during use, and a closed position in which the locking sleeve presses the at least one ball in the direction of the longitudinal axis of the receiving part for the purpose of locking the male coupling part in the female coupling part with the ball during use, wherein the male coupling part is embodied as an elongate pin which comprises in its outer wall a groove for receiving the at least one ball.

In the context of the invention "constructions" are understood to mean particularly supporting constructions.

The female coupling part is opened or closed according to the invention by displacing the locking sleeve over the receiving part by screwing the locking sleeve. Tools are not therefore necessary for coupling the coupling parts. Hammering is for instance not necessary to fix the male coupling part in the female coupling part. Work can therefore be done more quietly with the invention than with conventional couplings. The coupling part according to the invention can moreover be coupled quickly, this resulting in time savings during assembly of constructions.

For screwing purposes the locking sleeve comprises internal screw thread which co-acts with external screw thread of the receiving part.

A further advantage of the invention is that during the assembly of construction parts fewer components are required to form a coupling, since it is possible to dispense with a locking pin and cotter pin.

The coupling can moreover be opened and closed quickly by means of screwing the locking sleeve. This enables a rapid assembly of constructions.

The locking sleeve is optionally provided with a recess for receiving a hex key. A force can thus be exerted if desired on the locking sleeve with a hex key in order to open the coupling.

The receiving part can be wholly or partially tubular. The part which has a tube shape defines a cavity in the receiving part for receiving a male coupling part. The insertion opening at the outer end of the receiving part provides access to this cavity. The through-openings in the side wall of the tubular part debouch into this cavity.

The at least one through-opening is provided in the side wall of the tubular portion of the receiving part. The receiving part preferably comprises a plurality of through-openings, in each of which a ball is placed.

There are for instance 6, 7, 8, 9, 10, 11 or 12 openings arranged around the receiving part, wherein a ball is placed in each opening.

The locking sleeve preferably also encloses the one or more through-openings in the side wall of the receiving part in the opened position so that the balls are prevented from being able to fall out of the openings via the outer wall. The part of the locking sleeve which encloses the openings in the opened position will therefore have a larger inner diameter than the part enclosing the opening in the closed position. In the opened position some space is thus available for movement of the balls, while in the closed position the balls are urged to a position located further inward.

The female coupling part is preferably cylinder-symmetrical. A uniform distribution of the forces acting on the coupling is hereby realized. For example, a plurality of through-openings may be arranged in a cylinder-symmetrical manner and arranged at the same distance from each other in the wall of the receiving part.

The male coupling part is preferably cylinder-symmetrical. The male coupling part is preferably symmetrical in a plane perpendicularly of its longitudinal axis.

The receiving part, the locking sleeve and the one or more balls are for instance each manufactured from a metal or a metal alloy, more preferably aluminium or an aluminium alloy.

One of the receiving part and the locking sleeve is preferably manufactured from aluminium or an aluminium alloy while the other is manufactured from steel, preferably galvanized steel. This prevents two aluminium components moving along each other, whereby the aluminium can be damaged. The receiving part is preferably manufactured from an aluminium alloy while the locking sleeve is manufactured from steel, preferably galvanized steel. A further advantage of a steel locking sleeve is that the strength of the locking sleeve is increased.

A self-locating coupling is realized through the use of one or more balls. The male coupling part which is placed in the female coupling part comprises a groove for co-action with the ball. When the male coupling part is placed in the female coupling part and the locking sleeve is screwed into the closed position, the one or more balls are pressed by the locking sleeve in the direction of the male coupling part. The curved surface of the balls can exert a force here on the edge of the groove, wherein this force also comprises a force component which presses the male coupling part inward. The male coupling part is therefore pulled inward during closing of the locking sleeve so that a correct coupling is guaranteed between the coupling parts.

In other words, the ball ensures that the male coupling part is pulled into the female coupling part even if in the first instance the groove and ball are not fully aligned with each other. A correct coupling between the coupling parts is hereby guaranteed. In the closed position the balls can optionally function as ball bearing so that rotation of the male coupling part in the female coupling part becomes possible. If for instance lighting is coupled to a truss construction, it can be advantageous for some rotation to be possible. It is however not generally necessary for mutual connection of trusses that the coupling parts can rotate relative to each other.

The coupling is preferably suitable for coupling trusses. In an alternative embodiment the coupling is suitable for coupling construction tubes for single tube systems, i.e. single tubes for supporting constructions.

In a further preferred embodiment the through-opening is embodied as a conical hole. The conical hole has a diameter which decreases from the outer wall of the receiving part in the direction of the inner wall of the receiving part. The smallest inner diameter of the conical hole, i.e. the diameter of the opening at the position of the inner wall of the receiving part, is smaller than the diameter of the ball placed in the through-opening. The ball cannot therefore drop out of the opening via the inner side of the receiving part.

In a preferred embodiment the locking sleeve is screwed onto the receiving part by means of multiple-start thread, for instance quadruple-start thread. A relatively large displacement of the locking sleeve over the receiving part is thus obtained with one revolution. The screw thread is preferably configured so that one or less than one revolution, for instance half a revolution, can displace the locking sleeve from the closed position to the opened position. The multiple-start thread can for instance be quintuple-start thread, sextuple or octuple-start thread.

In a preferred embodiment the female coupling part comprises at least one stop for bounding the movement of the locking sleeve relative to the receiving part. Hereby prevented is that the locking sleeve can be screwed off the receiving part. The at least one stop also preferably prevents the locking sleeve being screwed to a position in which the locking sleeve no longer encloses the openings with the balls, so as to thus prevent the possibility of the balls falling out of the openings.

The coupling part comprises for instance two stops on either side of the locking sleeve. When the locking sleeve lies against the one stop, the locking sleeve is then situated in the opened position, while the locking sleeve is in the closed position when the locking sleeve lies against the other stop.

In a further preferred embodiment the at least one stop is provided as a stop ring screwed onto the receiving part. In an embodiment in which the female coupling part comprises two stops on either side of the locking sleeve, at least one stop is provided as screwable stop ring. The other stop can be formed integrally with the receiving part or likewise be provided as screwable stop ring.

In a preferred embodiment the at least one stop is located on a side of the locking sleeve opposite the side of the locking sleeve facing toward the insertion opening for the purpose of bounding movement of the locking sleeve in the direction toward the opened position, wherein the coupling further comprises a separate clamp which fits clampingly between the stop and the locking sleeve in the closed position of the locking sleeve.

The at least one stop defines an end point of the movement which the locking sleeve performs when it is moved to the open position. A second stop is preferably further provided on the other side of the locking sleeve for the purpose of bounding the movement in the opposite direction, i.e. a movement to the closed position.

In the closed position of the locking sleeve one side of the locking sleeve lies some distance from the at least one stop. The clamp embodied as separate element can be placed in the thus resulting space. The space between the stop and the locking sleeve can therefore be filled with the clamp. The clamp then blocks movement of the locking sleeve to the open position, so increasing the safety of the coupling. When release of the coupling is desired, the clamp can be removed from the space again so that the locking sleeve can be screwed back to its open position.

In a further preferred embodiment the groove in the outer wall of the male coupling part comprises an inclining wall for guiding the ball into the groove. This enhances the self-locating action of the coupling. The groove preferably has a rounded form, the curvature of which preferably corresponds to the curvature of the ball.

In a further preferred embodiment the male coupling part comprises rounded outer ends. If the male coupling part is not placed far enough into the female coupling part and the ball of the female coupling part does not make contact with the edge or wall of the groove but with the rounded outer end of the male coupling part, the ball will press against this rounded outer end when the coupling is closed. The male coupling part is hereby pressed out of the female coupling part, whereby it is immediately apparent that the male coupling part has not been properly inserted. The coupling can then be opened again, after which the male coupling part is inserted in a correct manner.

In a currently preferred embodiment the male coupling part is embodied as a solid element. The male coupling part can however alternatively be embodied as an elongate pin comprising a through-opening in the longitudinal direction. In conventional couplings the elongate pins comprise a through-hole in transverse direction for receiving a locking pin. According to the invention however, it is possible to dispense with a locking pin in transverse direction, and therefore also with a hole in transverse direction through the male coupling part. The male coupling part according to the invention can hereby be given a hollow form, i.e. with a through-opening in the longitudinal direction.

An advantage of a male coupling part in hollow form is that electric wires can be carried easily through the coupling part.

A further advantage of the hollow embodiment of the male coupling part is that material is saved. The male coupling part can moreover have a relatively low weight compared to conventional male coupling parts. The male coupling part can moreover hereby be manufactured from a material with a relatively high specific weight without the overall weight of the coupling part becoming too great.

The male coupling part is preferably manufactured from a metal or a metal alloy, and more preferably from aluminium or aluminium alloy.

In an embodiment the male coupling part is manufactured from an aluminium alloy from the 7000 group in accordance with the International Alloy Designation System (IADS). This type of aluminium alloy, also referred to as 7xxx aluminium, comprises zinc. The tensile strength of this type of alloy amounts to at least 300 MPa, and can even amount to about 700 MPa. The male coupling part is for instance manufactured from an aluminium 7068 alloy or aluminium 7079 alloy. A male coupling part manufactured from a 7xxx aluminium alloy is preferably provided with a through-opening in the longitudinal direction as described above.

In an embodiment the male coupling part is manufactured from a DIN 28 ST alloy (also: EN-2007, EN AW 2007, EN AW 2011/2007, AlCuMgPb or AW-AlCu4PbMgMn).

In another embodiment the male coupling part is manufactured from steel, such as chromium-nickel steel, chromium-molybdenum steel or chromium-nickel-molybdenum steel, such as 42CrMo4.

In an exemplary embodiment the receiving part of the female coupling part is open at both outer ends, i.e. in this embodiment the female coupling part comprises a through-opening in the longitudinal direction. When both the male and female coupling parts comprise a through-opening, electric wires can be carried through the whole coupling.

In a preferred embodiment the one outer end of the male coupling part is configured for coupling to the female coupling part and the other outer end of the male coupling part is configured for coupling to a second corresponding female coupling part.

In other words, the male coupling part can form a connection between two female coupling parts. The male coupling part is for this purpose arranged with its one outer end in the first female coupling part, after which the locking sleeve is moved to the closed position for the purpose of locking this one outer end of the male coupling part. The other outer end of the male coupling part then still protrudes from the first female coupling part. This other outer end is now inserted into the second female coupling part, after which this second female coupling part is also closed, whereby the connection is realized.

In a further preferred embodiment the first female coupling part comprises around the insertion opening of the receiving part a flange for co-action with a second corresponding flange of the second corresponding female coupling part.

Preferably, the receiving part of the first female coupling part has a recess which is adjacent to the flange and comprises a contact surface, and the male coupling part comprises on its outer wall two contact surfaces facing in opposite directions for co-action with the contact surfaces of the female coupling parts.

In other words, when the male coupling part is inserted with its one outer end into the first female coupling part, a first contact surface of the male coupling part makes contact with the wall of the recess in the first female coupling part. The other outer end of the male coupling part is then inserted into the second female coupling part, wherein the second contact surface makes contact with the wall of the recess of the second female coupling part.

The recess of the female coupling parts is preferably formed as a conical hole and the male coupling part comprises corresponding conical contact surfaces.

In a preferred embodiment the receiving part of the female coupling part is provided with a groove having therein a seal, preferably sealing ring, such as an O-ring.

The seal prevents the locking sleeve detaching in undesired manner, for instance due to undesired rotation of the locking sleeve because of vibrations. It is however emphasized that such a seal is not essential for this purpose.

A further advantage of the seal is that the dirt is prevented from entering the coupling.

For example, the groove containing the seal is provided close to the outer end that includes the insertion opening. For example, a sealing ring, such as an O-ring, is positioned such that it clamps against the locking sleeve in the closed position but does not clamp against the locking sleeve in the open position.

The sealing ring may be positioned such that it is visible in the opened position of the female coupling. In this case, the sealing ring is preferably provided with a conspicuous colour. The sealing ring is for instance red or orange. Therefore, the user will immediately notice that the coupling has been opened. This enhances the safety of the coupling.

In a preferred embodiment the groove including the seal is positioned such that it is covered by the locking sleeve in both the closed position and the opened position of the locking sleeve.

Preferably, the groove that includes the seal is positioned at the edge of the locking sleeve when the locking sleeve is in its opened position.

In this manner the seal seals the interior of the locking sleeve, in both the opened position and the closed position, thereby preventing dirt from entering the coupling.

In a preferred embodiment, the receiving part is provided with a closing element arranged to close of the tubular part at least partially when in the opened position of the locking sleeve no male coupling part is placed in the female coupling part.

In other words, the closing element partially or entirely closes of the interior of the tubular part, when no male coupling part is placed in the female coupling part. This prevents dirt from entering the female coupling part.

In a currently preferred embodiment, the closing element is arranged in the tubular part of the receiving part, wherein the closing element is movable against a spring force in the longitudinal direction of the receiving part from a closing position wherein the closing element closes of the at least one through-opening, and an opened position wherein the closing element exposes the at least one through-opening. In this embodiment the closing element is arranged to close of the inner side of the through-openings, wherein the balls are positioned, when no male coupling part is placed in the female coupling part. It is noted that when the male coupling part is placed in the female coupling part, the male coupling part will force the closing element to its opened position, thereby exposing the at least one through-opening to enable the balls to cooperate with the groove in the male coupling part. When in the opened position of the locking sleeve the male coupling part is removed from the female coupling part, the spring force will bring the closing element back to its closing position wherein the at least one through-opening is again closed of against dirt.

For example, the closing element may comprise a piston.

In a further preferred embodiment, the end of the closing element directed towards the insertion opening comprises a head having a circular cross section with a diameter corresponding to the inner diameter of the tubular part at the position of the through-openings.

In other words, the head of the closing element closely fits the interior wall of the tubular part, such that the closing element completely fills the tubular part at the position of the through-openings.

In a further preferred embodiment the front face of the head which is directed towards the insertion opening comprises a recess, i.e. a lower part, for receiving the male coupling part, wherein an upright edge is formed around the recess for closing of the at least one through-opening in the closed position of the closing element. In other words, the recess forms a receiving part for receiving the male coupling part.

The upright edge extends along the entire perimeter of the head of the closing element. The upright edge determines the dimensions of the lateral surface of the head that contacts the inner wall of the tubular part. The length of said contacting surface, measured in the longitudinal direction of the receiving part, is greater than the diameter of the at least one trough-opening, such that said contacting surface is able to cover the at least one through-opening.

The upright edge preferably comprises a chamfered inner wall, such that during placing of the male coupling part the male coupling part is guided to a correctly aligned position. This enables quick assembly and disassembly.

The closing element may be made of metal, such as aluminium. Preferably however, the closing element is made of plastic.

For example, the closing element is made of polyethylene (PE), such as high density polyethylene (HDPE), polypropylene (PP), polyvinylchloride (PVC) or polyoxymethylene (P01\4) or a polyether ketone (PEK). Other plastics are also possible.

For example a chip or tag, such as an RFID chip or RFID tag, may be moulded into in the plastic closing element. This has the advantage that the coupling may be provided with a chip including readable information, such as a unique identification code.

The invention further relates to a truss provided with the coupling as described above, a method for manufacturing a coupling and a use of the coupling for connecting trusses, lattice girders and/or supporting construction parts. The same advantages and effects as described above in relation to the coupling according to the invention also apply for the truss, the method and the use.

The method for manufacturing a coupling comprises the following steps of:
    manufacturing a female coupling part and a male coupling part, the manufacture of a female coupling part comprising of:
        manufacturing a receiving part which is at least partially tubular and comprises at its outer end an insertion opening for receiving the male coupling part in the tubular portion, with at least one through-opening in the wall of the tubular portion of the receiving part;
        placing in the at least one through-opening a ball which is movable in radial direction of the receiving part;
        screwing a locking sleeve by means of screw thread onto the receiving part such that by being screwed the sleeve is movable relative to the receiving part between an opened position, in which the locking sleeve allows a movement of the ball in the at least one through-opening in a direction away from the longitudinal axis of the receiving part for the purpose of placing a male coupling part into the receiving part or removing it from the receiving part during use, and a closed position in which the locking sleeve presses the ball in the direction of the longitudinal axis of the receiving part for the purpose of locking the male coupling part in the female coupling part during use,
    manufacturing the male coupling part, comprising of embodying the male coupling part as elongate pin, and arranging in the outer wall of the male coupling part a groove for receiving the at least one ball.

BRIEF DESCRIPTION OF THE DRAWINGS

Further advantages, features and details of the invention are elucidated on the basis of preferred embodiments thereof, wherein reference is made to the accompanying drawings.

FIGS. 10A-B show a coupling according to a fourth embodiment of the invention.

DETAILED DESCRIPTION

Figure 1:
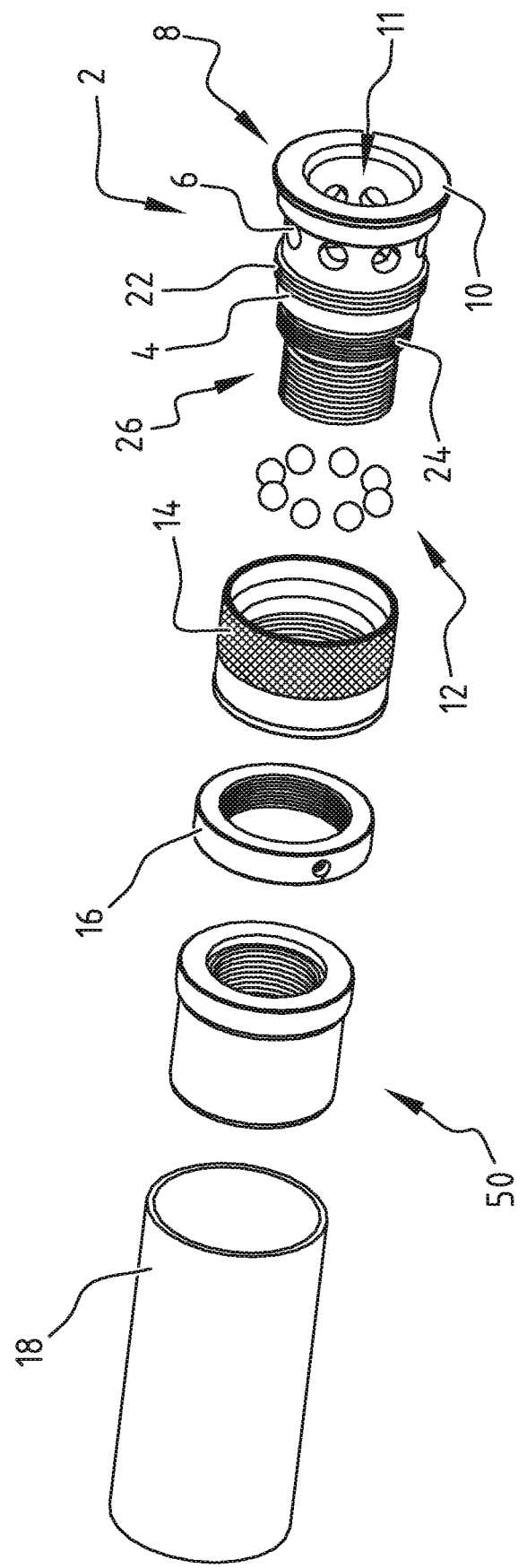
FIG. 1 shows a cut-away view of a female coupling part of the coupling according to a first embodiment of the invention

Female coupling part 2 (FIG. 1) comprises a tubular receiving part 4, the side wall of which is provided all around with holes 6. Outer end 8 comprises an insertion opening 11 for receiving a male coupling part in the form of a pin, also referred to as coupling piece or coupler. A stop ring 10 is moreover provided on outer end 8.

Figure 2:
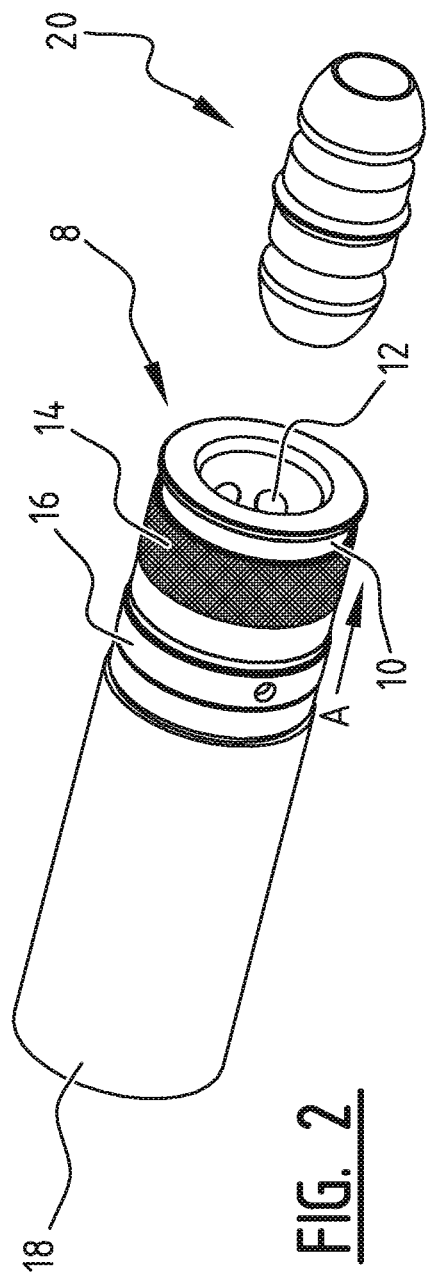
FIG. 2 shows the female coupling part of FIG. 1 which is connected to a tube of a truss, and a pin for receiving in the female coupling part.

Female coupling part 2 further comprises balls 12 for placing in holes 6. In addition, female coupling part 2 comprises a locking sleeve 14 which encloses receiving part 4 in mounted position (FIG. 2). Locking sleeve 14 is optionally provided with a serrated outer wall as shown in the figure for the purpose of providing grip.

Figure 3:
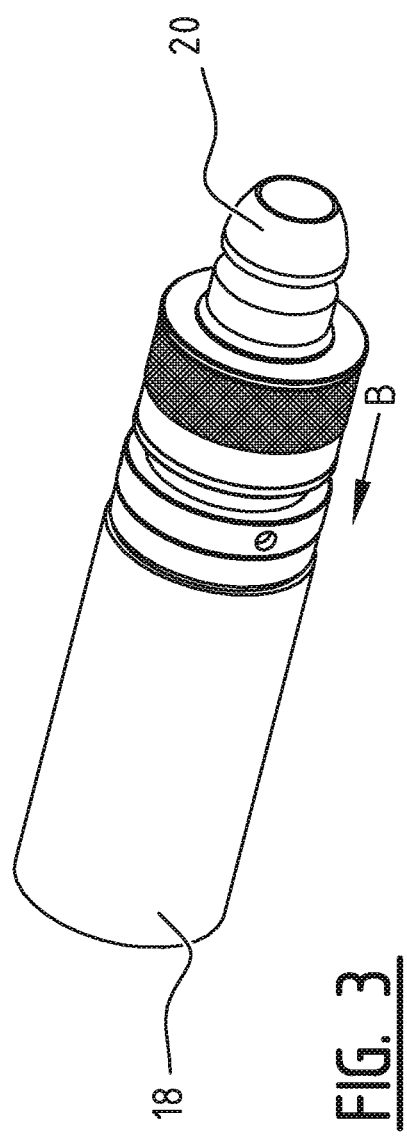
FIG. 3 shows the female coupling part and the pin of FIG. 2 in coupled position.

Female coupling part 2 can be provided on a construction part. Coupling 2 is for instance attached to a tube 18 of a truss (FIGS. 1-3). Receiving part 4 of coupling 2 is for instance coupled by means of a screw connection to a connecting piece 50, which is in turn fixed in tube 18, for instance by means of welding.

Receiving part 4 comprises external screw thread 22 for screwing sleeve 14 onto receiving part 4. Receiving part 4 moreover comprises a second external screw thread 24 for screwing second stop ring 16 onto receiving part 4. Outer end 26 of receiving part 4 is optionally also provided with screw thread for attaching the coupling to a construction part such as tube 18.

Sleeve 14 optionally comprises a recess for receiving a hex key, wherein the hex key can serve as tool in unscrewing the sleeve 14 from its closed position.

A male coupling part 20 takes the form of an elongate pin. Pin 20 can be received in receiving part 4. The coupling can then be closed by screwing sleeve 14 as according to arrow A in the direction of stop ring 10. Stop ring 10 bounds the movement of locking sleeve 14 here. Pin 20 is held in the receiving part in the locked position (FIG. 3). In order to open the coupling the sleeve 14 is screwed as according to arrow B in the direction of stop ring 16. Stop ring 16 here bounds the movement of locking sleeve 14 in direction B.

In the shown embodiment screw thread 22 is multiple-start, and in particular quadruple-start thread. The sleeve can hereby be carried in one revolution from the closed to the open position. In an advantageous alternative embodiment octuple-start thread is applied so that the sleeve can be carried in a half-revolution from the closed to the open position. Opening and closing of the coupling will be further elucidated hereinbelow with reference to FIGS. 4-6.

Figure 4:
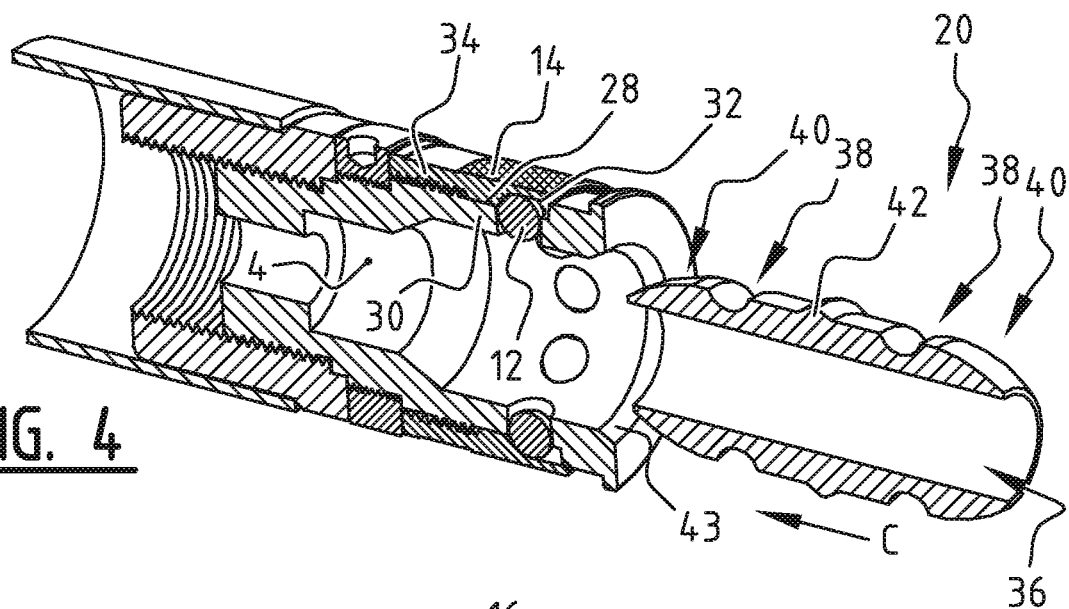
FIG. 4 shows a cross-section of the female coupling part with pin in an opened position.

Sleeve 14 comprises on its inner wall a contact surface 28 (FIG. 4). In the opened position (FIG. 4) contact surface 28 is located at the position of a wall part 30 of receiving part 4 which has no external screw thread. A wall part 32 of sleeve 14 lying closer to insertion opening 11 than contact surface 28 has an inner diameter which is greater than at the position of contact surface 28. In the opened position some space is hereby provided for movement of balls 12.

In short, as seen in the direction from outer end 26 (FIG. 1) to insertion opening 11 sleeve 14 successively comprises a part 34 (FIG. 4) with internal screw thread for co-action with screw thread 22 of receiving part 4, contact surface 28 and a part 32 with an inner diameter greater than the inner diameter at the position of contact surface 28. The transition from contact surface 28 to part 32 preferably has a rounded shape for co-action with balls 12, wherein the rounded shape preferably has a curvature substantially corresponding to the curvature of balls 12.

In the shown embodiment the inner diameter of sleeve 14 at the position of contact surface 28 is equal to, or at least roughly equal to, the outer diameter of receiving part 4 at the position of openings 6.

It is noted that female coupling part 2 is configured such that sleeve 14 also encloses balls 12 in the opened position, so preventing the possibility of balls 12 dropping out of opening 6.

Pin 20 is elongate and may comprise a through-hole 36 in its longitudinal direction.

Pin 20 is provided on its outer wall with grooves 38 which extend in the shown embodiment round the whole periphery of the cylinder-symmetrical pin 20. The grooves have a substantially semi-circular section, the curvature of which preferably corresponds to the curvature of balls 12. Outer ends 40 of pin 20 are rounded.

Figure 5:
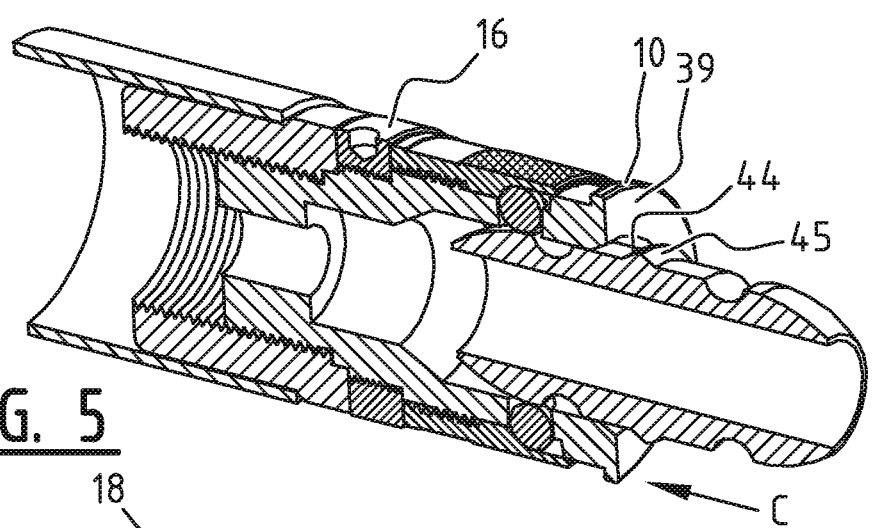
FIG. 5 shows a cross-section of the female coupling part with pin in a position in which the pin has been partially inserted into the receiving part of the female coupling part.

For coupling of construction parts pin 20 is inserted into female coupling part 2 (FIG. 5). Because sleeve 14 allows movement of balls 12 in the opened position of female coupling part 2, pin 20 can be moved past balls 12 during insertion. In order to align pin 20 with coupling 2, pin 20 comprises a protrusion 42 which extends in radial direction beyond the other parts of pin 20.

Protrusion 42 comprises an inclining contact surface directed toward coupling 2 for co-action with a matching contact surface 43 of stop ring 10 (FIG. 5) which is embodied as conical hole. Pin 20 is hereby aligned relative to female coupling part 2: pin 20 is inserted as according to arrow C into insertion opening 11 until contact surfaces 43, 44 make contact and further movement in the direction of arrow C is prevented. When contact surfaces 43, 44 make contact with each other, one of the grooves 38 of pin 20 is aligned with holes 6 of receiving part 4 so that balls 12 can be earned into this groove 38.

Figure 6:
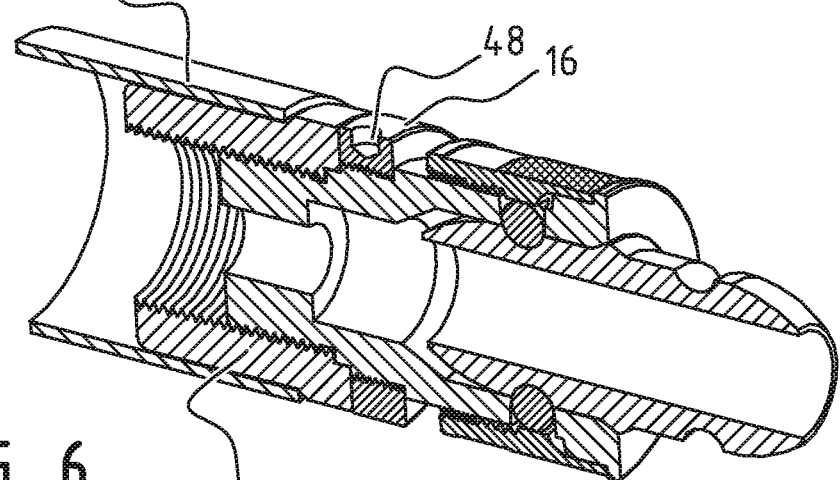
FIG. 6 shows a cross-section of the female coupling part with pin in a closed position.

For the purpose of holding pin 20 in female coupling part 2, sleeve 14 is now screwed in the direction of arrow A, wherein contact surface 28 of sleeve 14 is displaced in the direction of holes 6 (FIG. 6). Balls 12 are locked here in groove 38 of pin 20 by contact surface 28 of sleeve 14. Pin 20 is therefore held in receiving part 4 of female coupling part 2. The screwing movement of sleeve 14 over receiving part 4 in the direction of insertion opening 11 is bounded by stop ring 10. Stop ring 10 therefore prevents contact surface 28 being screwed beyond the holes 6, whereby the coupling could be released again. On the other side second stop ring 16 bounds the movement of sleeve 14 over receiving part 4 as according to arrow C, i.e. the movement to the opened position is bounded. This prevents wall part 32 of receiving part 4 being moved beyond openings 6, whereby balls 12 could drop out of holes 6. Second stop ring 16 optionally comprises a recess 48 for receiving a hex key which can serve as tool in fixing stop ring 16 on receiving part 4.

Holes 6 have a conical form, wherein the diameter of the openings decreases to some extent from the outer wall to the inner wall of receiving part 4. This prevents balls 12 dropping out of holes 6 in the direction of the interior of receiving part 4.

Because balls 12 are applied the coupling is self-locating. That is, if pin 20 is not placed with contact surface 44 wholly against contact surface 43 in insertion opening 11, ball 12 will press against the incline of groove 38 during closing of female coupling part 2 so that pin 20 is pulled inward until ball 12 has reached the lowest point in groove 38.

In this closed position (FIG. 6) an outer end of male coupling part 20 still protrudes from female coupling part 2. This outer end can then be placed in a second corresponding female coupling part. Front surface 39 of stop ring 10 forms a flange here against which the corresponding stop ring of the second female coupling part is placed. Protrusion 42 of male coupling part 20 comprises two contact surfaces 44, 45. Contact surface 44 lies in the closed position against conical contact surface 43 of receiving part 4. Contact surface 45 co-acts in similar manner with a conical contact surface of the second female coupling part. Because male coupling part 20 is pulled inward during closing, the two female coupling parts are pressed with their flanges 39 against each other.

In FIG. 5 pin 20 is still not sufficiently inserted to take advantage of the self-locating capability of coupling 2. In this case balls 12 do not make contact with groove 38 but make contact with the rounded outer end 40 of pin 20. If coupling 2 is now nevertheless closed by screwing sleeve 14 in the direction of stop 10 (as according to arrow A), balls 12 will then press against rounded outer end 40 of pin 20 so that pin 20 is moved outward. It will then be immediately apparent to the user that pin 20 has been inserted incorrectly, so that the user can open the coupling again in order to then insert pin 20 correctly.

In the shown embodiment stop ring 10 is formed integrally with receiving part 4. It is however also possible to provide receiving part 4 with external screw thread, wherein stop ring 10 is provided as separate ring with internal threaded part so that it can be screwed onto receiving part 4. If desired, stop ring 16 can in that case be formed integrally with receiving part 4, although it is also possible to provide both stop rings 10, 16 as separate components.

Female coupling part 2 is attached in the shown embodiment to a tube 18 of a truss. Optionally provided for this purpose is a connecting piece 50 which is fixed into tube 18, for instance by welding. Connecting piece 50 comprises internal screw thread so that outer end 26 of receiving part 4 can be screwed into connecting piece 50.

Figure 7:
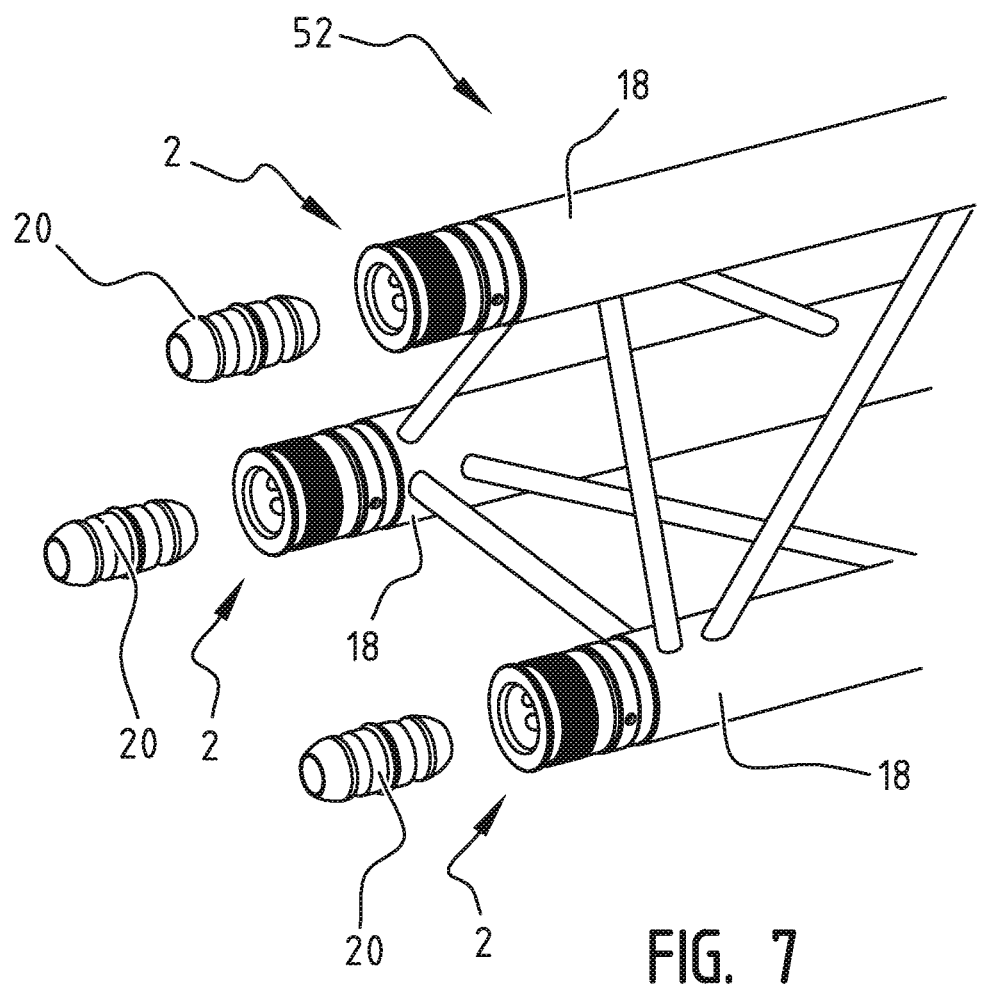
FIG. 7 shows a truss provided with a female coupling part according to an embodiment of the invention.

Shown in FIG. 7 is a truss 52 with parallel tubes 18 which are connected to each other by means of bars. Shown in the example is a truss with a triangular shape, although the invention can likewise be applied to trusses with quadrangular or other shapes. Each tube 18 is provided with a female coupling part 2 according to the invention. Placed in each female coupling part 2 is a male coupling part 20 for coupling of truss 52 to a similar truss.

Figure 8:
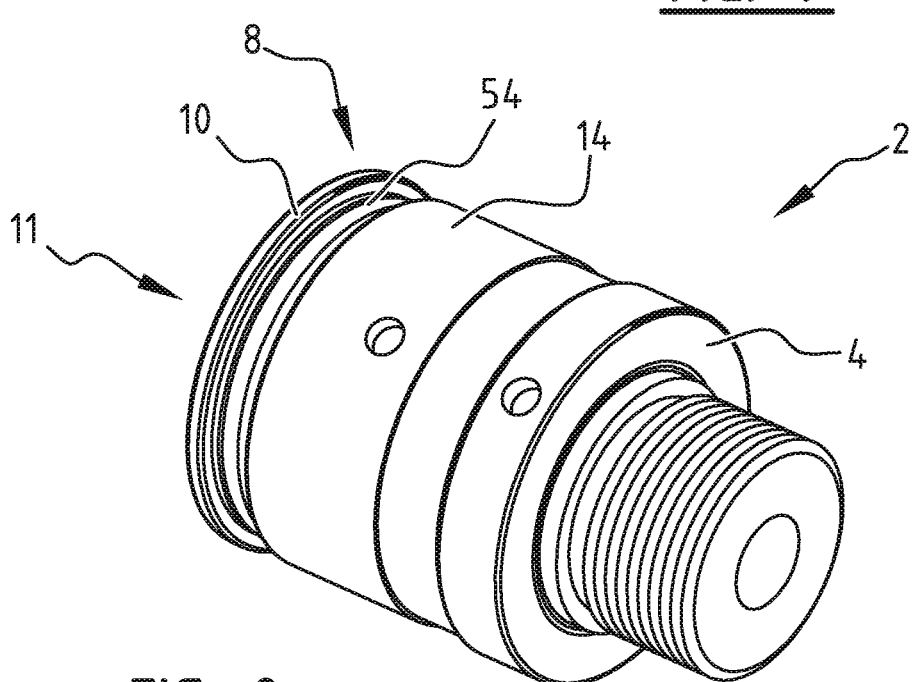
FIG. 8 shows a female coupling part of a coupling according to a second embodiment of the invention in the opened position.

A second exemplary embodiment of a female coupling part 2 is shown in FIG. 8. The figure shows female coupling part 2 with locking sleeve 14 in the opened position. Female coupling part 2 comprises a groove in its outer wall close to outer end 8 with insertion opening 11. The groove is situated in the shown embodiment directly behind stop ring 10. An O-ring 52 is placed in the groove. O-ring 52 is visible in the opened position. When locking sleeve 14 is moved to the closed position, sleeve 14 slides over O-ring 52. O-ring 52 clamps here against sleeve 14 so that the sleeve is held in place. Locking sleeve 14 is hereby prevented from opening in undesired manner.

The O-ring is preferably provided with a conspicuous colour, such as red or orange, so that the user immediately notices when the coupling is not closed.

Figure 9:
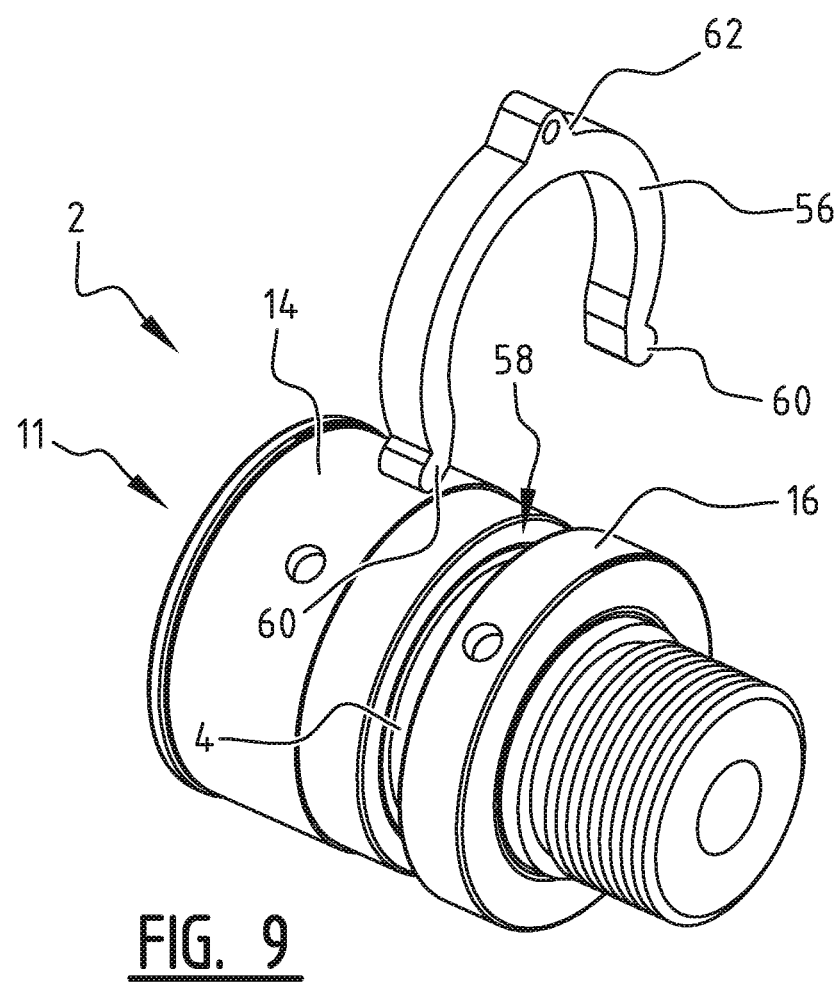
FIG. 9 shows a female coupling part of a coupling according to a third embodiment of the invention in the closed position.

In a third embodiment the coupling comprises a separate clamp 56 (FIG. 9). In the closed position of locking sleeve 14 as shown in FIG. 9 stop 16 is situated some distance from locking sleeve 14. Thus present between locking sleeve 14 and stop 16 is a space 58, which in the shown embodiment is annular. Clamp 56 can be placed in space 58 in order to thus block movement of locking sleeve 14 to the open position.

Clamp 56 has a form fitting onto the receiving part at the position of space 58. In the shown embodiment clamp 56 is U-shaped so that it fits in clamping manner round the substantially cylindrical outer wall of receiving part 4 at the position of space 58.

Clamp 56 is embodied in the shown example as resilient element, i.e. the legs of the U-shaped clamp 56 can move resiliently so that the clamp can be snapped round receiving part 4. Clamp 56 is for instance manufactured from plastic.

Clamp 56 is fitted for instance at the outer ends of its U-shape with optional protrusions 60. Protrusions 60 serve as point of engagement for removing clamp 56 from a space 58 again if desired in order to enable opening of the coupling.

Roughly halfway along its U-shape the clamp 56 comprises in the shown embodiment a further optional protrusion 62 provided with an opening. A wire can be inserted through this opening so that clamp 56 can be removed from receiving part 2 by pulling on the wire. When clamp 56 is not placed round receiving part 2, clamp 56 can be suspended temporarily with the wire from the construction to which coupling 2 is attached.

It is noted that a female coupling part can if desired comprise a groove with O-ring 52 as in the second embodiment as well as a clamp 56 as in the third embodiment.

In FIGS. 8 and 9, sleeve 14 is provided with a recess for receiving a hex key, which may serve as a tool for unscrewing sleeve 13 from its closed position. However, the recess is optional and may be omitted if desired.

A method for manufacturing a female coupling part and a pin as described above will be elucidated hereinbelow with reference to FIG. 1. Receiving part 4 is manufactured from metal, preferably aluminium. Receiving part 4 is manufactured for instance by pressing, extrusion, casting and/or machining. Receiving part 4 is for instance formed by deforming a metal tube by means of pressing, after which screw threads 22, 24 and optionally 26 are manufactured by machining, and openings 6 are made by means of drilling. Sleeve 14 and stop ring 16 can be manufactured from the same material as receiving part 4. Preferably however, sleeve 14 is manufactured from a material other than receiving part 4, preferably steel, such as galvanized steel. Sleeve 14 and/or ring 16 are for instance likewise manufactured by means of pressing, extrusion, casting and/or machining. Balls 12 are placed in the conical holes 6 of receiving part 4. Sleeve 14 is then screwed onto receiving part 4. Finally, stop ring 16 is screwed onto receiving part 4.

Pin 20 is manufactured from a tensively strong material. Use is for instance made of an aluminium alloy with zinc, more preferably of a 7xxx aluminium alloy. The base of pin 20 is for instance formed by pressing of the aluminium alloy, after which grooves 38, rounded outer ends 40 and protrusion 42 are formed on pin 20 by machining the outer wall of pin 20. The opening which passes through pin 20 in the longitudinal direction is formed in the pressing process so that material is saved. The through-opening can alternatively be made by means of drilling. In a currently preferred embodiment the pin 20 takes a solid form, preferably of a 28 ST aluminium alloy.

In the shown exemplary embodiments receiving part 4 is tubular along its whole length. It is alternatively possible according to the invention for outer end 8 to be tubular, while another part of receiving part 4 takes a solid form.

In a fourth embodiment (FIGS. 10A-10B), a piston 164 is provided in the receiving part 104 of the female part 102. The piston 164 comprises a head 166 and a rod 168 extending from the head in a direction away from the insertion opening of the receiving part 104. A spring 170 is provided around the rod 168 of the piston. The receiving part 104 comprises a chamber 172 for accommodating the spring 170, wherein the spring 170 bears on a rear wall 174 of this chamber 172.

In the example shown, the rod 168 of the piston 164 extends through the receiving part 104, such that the rear end of the rod 168 extends beyond the receiving part 104. The rear end is provided with a groove 176 wherein a stopping ring is mounted to limit the movement of the piston 164 towards the insertion opening.

The head 166 of the piston 164 is substantially cylindrically shaped. The front face of the head 166, which is directed towards the insertion opening, comprises a recess for receiving the male part 120. An upright edge 180 is formed around the recess. The edge 180 forms part of the lateral surface of the head 166 directed to the inner wall of the receiving part 104. In the closing position of the piston 164 said lateral surface closes of the through-openings in which the balls 112 are accommodated, as shown in FIG. 10A. FIG. 10B shows the opened position of the piston 164, wherein the piston 164 is pushed away by the male coupling part 120 against the spring force of spring 170. In said opened position the lateral surface of head 166 no longer covers the openings for balls 112, enabling the balls 112 to be positioned into the groove 138 of the male coupling part by closing the locking sleeve 114.

In the opened position of the locking sleeve (FIG. 10A) the piston 164 closes of the openings for balls 112 when the male coupling part has not yet been fitted. This prevents dirt entering in these openings. A further advantage is that the piston 164 in the opened position of the locking sleeve prevents the locking sleeve from being closed when no male coupling part is placed in the receiving part.

In addition, the female coupling part 102 comprises a groove with O-ring 152, which resembles the groove with O-ring 52 as described above. However, for female coupling part 102 the O-ring 152 is positioned at the front end of the locking sleeve 114 when the locking sleeve is in its closed position (see FIG. 10A). Therefore, the O-ring 152 further seals the receiving part 114 from dirt.

The closing element 164 of FIGS. 10A-B and/or the sealing 152 can be combined with the other embodiments (FIGS. 1-9), to generate further alternative embodiments of the invention.

The invention is by no means limited to the above described preferred embodiments. The rights sought are defined by the following claims, within the scope of which many modifications can be envisaged.

The invention claimed is:

1. A coupling for connecting construction parts, comprising a female coupling part and a male coupling part for placing in the female coupling part, the female coupling part comprising:
a receiving part which is at least partially tubular and comprises at its outer end an insertion opening for receiving the male coupling part in a tubular portion, wherein at least one through-opening is provided in the wall of the tubular portion of the receiving part;
a ball which is placed in each at least one through-opening and which is movable in a radial direction of the receiving part; and
a locking sleeve which is screwed onto the receiving part and encloses the receiving part, wherein by being screwed the locking sleeve is movable relative to the receiving part in a longitudinal direction of the receiving part between an opened position, in which the locking sleeve allows a movement of the ball in the at least one through-opening in a direction away from a longitudinal axis of the receiving part for the purpose of placing the male coupling part into the receiving part or removing it from the receiving part during use, and a closed position in which the locking sleeve presses the at least one ball in the direction of the longitudinal axis of the receiving part for the purpose of locking the male coupling part in the female coupling part with the at least one ball during use,
wherein the male coupling part is embodied as an elongate pin which comprises in its outer wall a groove for receiving the at least one ball,
wherein the female coupling part further comprises at least one stop for bounding the movement of the locking sleeve relative to the receiving part,
wherein the stop is provided as a stop ring screwed onto the receiving part,
wherein the stop is located on a side of the locking sleeve opposite the side of the locking sleeve facing toward the insertion opening for the purpose of bounding movement of the locking sleeve in the direction toward the opened position, and
wherein the coupling further comprises a separate clamp which fits clampingly between the stop and the locking sleeve in the closed position of the locking sleeve.

2. The coupling as claimed in claim 1, wherein the locking sleeve is screwed onto the receiving part by means of a multiple-start thread.

3. The coupling as claimed in claim 1, wherein the groove has an inclining wall for guiding the ball into the groove, and the groove has a rounded form.

4. The coupling as claimed in claim 1, wherein the male coupling part comprises rounded outer ends.

5. The coupling as claimed in claim 1, wherein the male coupling part comprises a through-opening in the longitudinal direction.

6. The coupling as claimed in claim 1, wherein the male coupling part is manufactured from an aluminium alloy from the 7000 group in accordance with the International Alloy Designation System (IADS).

7. The coupling as claimed in claim 1, wherein one outer end of the male coupling part is configured for coupling to the female coupling part and the other outer end of the male coupling part is configured for coupling to a second corresponding female coupling part.

8. The coupling as claimed in claim 7, wherein the female coupling part comprises around the insertion opening of the receiving part a flange for co-action with a second corresponding flange of the second corresponding female coupling part,
wherein the receiving part of each female coupling part has a recess which is adjacent to the flange and comprises a contact surface, and
wherein the male coupling part comprises on its outer wall two contact surfaces facing in opposite directions for co-action with the contact surfaces of the female coupling parts.

9. The coupling as claimed in claim 1, wherein the receiving part of the female coupling part is provided with a groove having therein a sealing ring.

10. The coupling as claimed in claim 9, wherein the groove including the sealing ring is positioned such that it is covered by the locking sleeve in both the closed position and the opened position of the locking sleeve.

11. The coupling as claimed in claim 1, wherein the receiving part is provided with a closing element arranged to close off at least a part of the tubular portion when in the opened positioned of the locking sleeve no male coupling part is placed in the female coupling part.

12. The coupling as claimed in claim 11, wherein the closing element is arranged in the tubular portion of the receiving part, wherein the closing element is movable in the longitudinal direction of the receiving part against a spring force from a closing position wherein the closing element closes off the at least one through-opening, and an opened position wherein the closing element exposes the at least one through-opening.

13. The coupling as claimed in claim 12, wherein the end of the closing element directed towards the insertion opening comprises a head having a circular cross section with a diameter corresponding to the inner diameter of the tubular portion at the position of the through-openings.

14. The coupling as claimed in claim 13, wherein a front face of the head which is directed towards the insertion opening comprises a recess for receiving the male coupling part, wherein an upright edge is formed around the recess for closing off the at least one through-opening in the closed position of the closing element.

15. The coupling as claimed in claim 11, wherein the closing element is made of plastic.

16. A truss provided with the coupling as claimed in claim 1.

17. A method for manufacturing a coupling, comprising the following steps of:
- manufacturing a female coupling part, comprising the steps of:
  - manufacturing a receiving part which is at least partially tubular and comprises at its outer end an insertion opening for receiving a male coupling part in a tubular portion, with at least one through-opening in the wall of the tubular portion of the receiving part;
  - placing in each at least one through-opening a ball which is movable in a radial direction of the receiving part;
  - screwing a locking sleeve by means of a screw thread onto the receiving part such that by being screwed the sleeve is movable relative to the receiving part in a longitudinal direction of the receiving part between an opened position, in which the locking sleeve allows a movement of the at least one ball in the corresponding through-opening in a direction away from a longitudinal axis of the receiving part for the purpose of placing a male coupling part into the receiving part or removing it from the receiving part during use, and a closed position in which the locking sleeve presses the at least one ball in the direction of the longitudinal axis of the receiving part for the purpose of locking a male coupling part in the female coupling part with the at least one ball during use, and
- manufacturing a male coupling part as an elongate pin, in the outer wall of which a groove for receiving the at least one ball is arranged,
  - wherein the female coupling part comprises at least one stop for bounding the movement of the locking sleeve relative to the receiving part,
  - wherein the stop is provided as a stop ring screwed onto the receiving part,
  - wherein the stop is located on a side of the locking sleeve opposite the side of the locking sleeve facing toward the insertion opening for the purpose of bounding movement of the locking sleeve in the direction toward the opened position, and
  - wherein the coupling comprises a separate clamp which fits clampingly between the stop and the locking sleeve in the closed position of the locking sleeve.

* * * * *